United States Patent [19]
Dvorak

[11] 3,945,287
[45] Mar. 23, 1976

[54] SHEET SHEAR

[76] Inventor: Jim Dvorak, Cosmos, Minn. 44106

[22] Filed: Sept. 6, 1974

[21] Appl. No.: 503,878

[52] U.S. Cl. .................... 83/628; 83/375; 83/624;
83/643; 83/821; 83/698
[51] Int. Cl.² .................. B26D 5/16; B26D 5/42
[58] Field of Search ............ 83/698, 375, 563, 613,
83/624, 625, 626, 627, 642,
643, 644, 821, 628

[56] References Cited
UNITED STATES PATENTS

| | | | |
|---|---|---|---|
| 249,831 | 11/1881 | Gault | 83/642 X |
| 345,358 | 7/1886 | Boehme | 83/624 |
| 353,045 | 11/1886 | Witherell | 83/624 X |
| 374,306 | 12/1887 | Keene | 83/624 X |
| 959,674 | 5/1910 | Woodward | 83/642 X |
| 1,918,059 | 7/1933 | Sherman | 83/624 |
| 2,808,883 | 10/1957 | Knokey | 83/642 X |
| 3,678,792 | 7/1972 | Dvorak | 83/627 X |

Primary Examiner—Donald R. Schran
Assistant Examiner—W. D. Bray

[57] ABSTRACT

A metal plate shears for cutting large sheets of metal includes a fixed blade, and a movable blade cooperable therewith. The movable blade is mounted on a plate having a plurality of circular apertures therein. Discs are mounted in these apertures, the discs being eccentrically supported, the axes of the eccentrics being in the same angular relation to and the same angular relation from, the centers of the discs. Arms are secured to the discs, and hydraulic means are provided for rotating the discs about their eccentric axes. Rotation of the discs lowers the plate bearing the movable cutting knife past the fixed knife, shearing off a sheet inserted between the blades.

9 Claims, 4 Drawing Figures

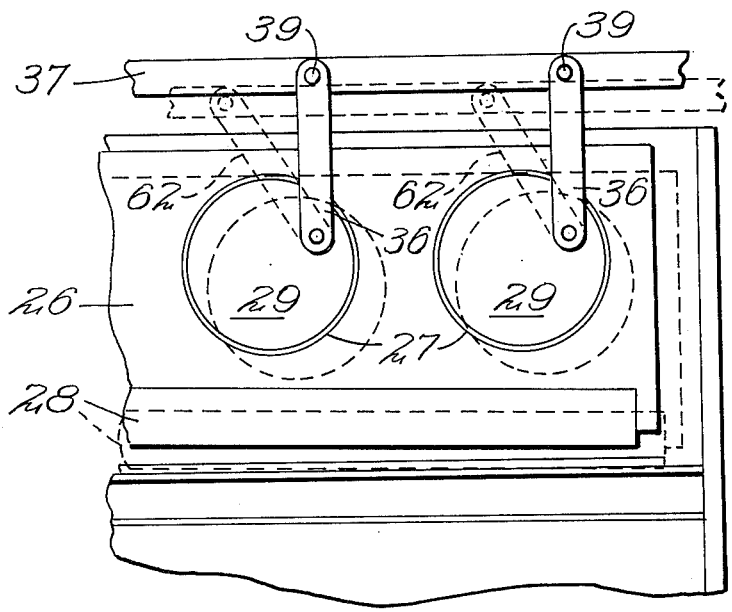
Fig. 2
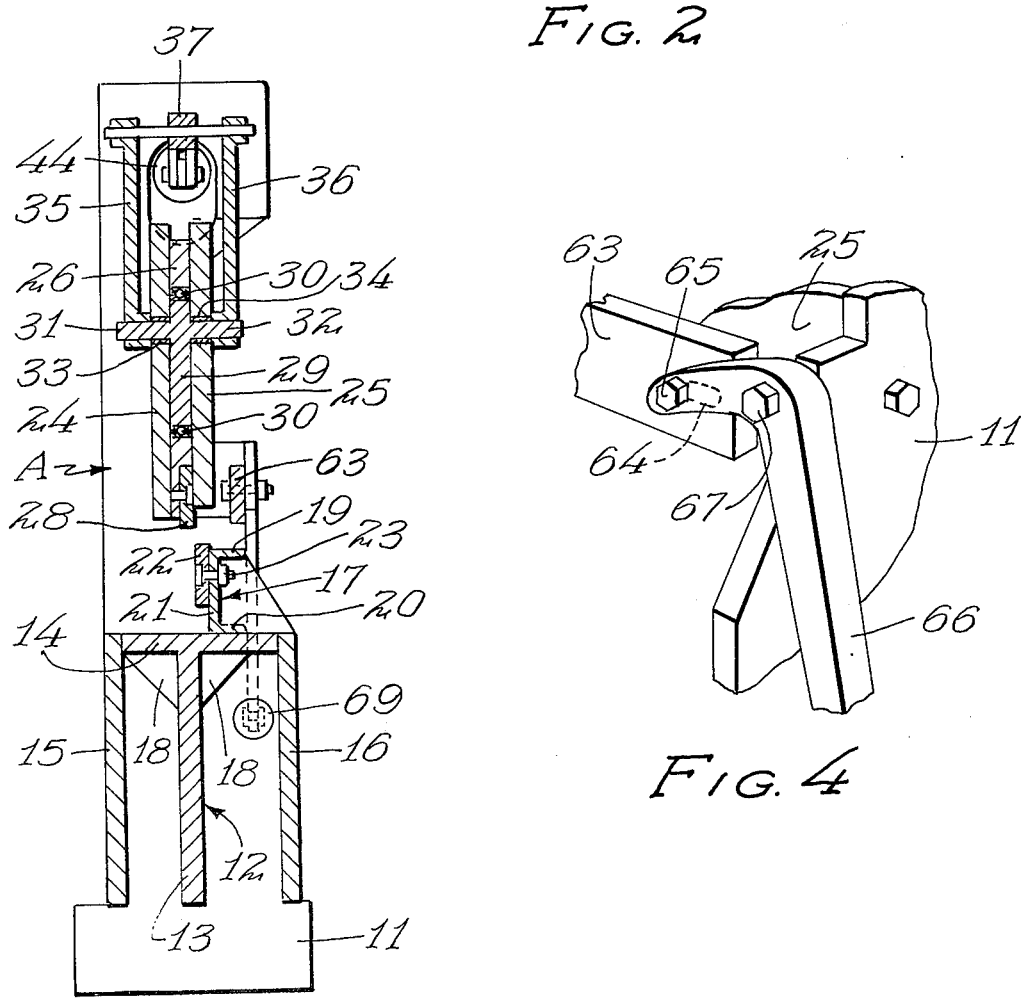
Fig. 3
Fig. 4

(3,945,287)

SHEET SHEAR

This invention relates to a plate shear and deals particularly with a shear adapted to cut off plates of metal for the like which may be of substantial thickness and considerable width.

BACKGROUND OF THE INVENTION

In the art of working metal, it is often necessary to cut off plates which are of considerable thickness and considerable width. This is normally accomplished by providing a fixed blade over which the plate to be cut is inserted, and providing a movable blade which normally moves downwardly in a vertical direction against the plate to be sheared, shearing the plates between the fixed blade and the vertical and movable blade.

Numerous devices have been used for this purpose. For example, U.S. Pat. No. 3,678,792 issued July 25, 1972 to Frank Dvorak discloses a frame having opposite end portions which are fixed to a supporting base which includes end members which extend upwardly to support a vertically slidable plate having a movable shearing edge along its lower edge. A fixed shearing blade is mounted upon the base. The movable plate includes a series of ramps which are spaced and similarly inclined. By forcing rollers against the ramp, and moving the rollers in unison up the ramp, the movable plate is forced downwardly to shear off the plate inserted between the shearing blades.

Numerous other forms of plate shears have been produced, one of the important differences being in the particular means of raising and lowering the movable shearing plate relative to the frame.

SUMMARY OF THE INVENTION

The present invention lies in the provision of a plate shear including a base portion having upwardly extending ends secured thereto which support a pair of spaced parallel supporting means between which the movable plate may move. The movable plate is preferably provided with a series of circular apertures therethrough, the apertures being preferably at substantially equal distances from the top of the movable plate. Discs are supported in these apertures by suitable bearing means so that the discs can pivot readily within the apertures. The discs are mounted upon axes which are eccentric relative to the centers of the discs. The distance between the pivotal supports and the centers of the discs is equal, as is the angularity between the pivotal supports and the centers of the discs. The pivots supporting the discs are supported by the supporting means on opposite sides of the movable plate, means are provided to rotate the pivots in unison, and rotation discs acts to raise and lower the movable plates.

In view of the fact that the discs are readily rotatable in the movable plates, and in view of the fact that the eccentricity of the pivot means supporting the discs is identical on each of the discs, the rotation of the pivots will tend to lower the movable plate on one direction of pivotal movement, and to raise the movable plate when the discs are rotated in the opposite direction.

A feature of the present invention resides in the fact that the discs are provided with pivots which are aligned on opposite sides of the discs and which are preferably supported in suitable bearings in the supports on opposite sides of the movable plate. The pivots preferably extend through the fixed sides, and are keyed to arms which extend in parallel relation from the pivots. The arms are connected by a connecting member which is pivotally attached to the opposed arms extending from each disc. By movement of ths connecting member, the discs are rotated, moving the movable plate in a direction to shear off the plate between the blade, and returning the discs to their normal position.

A feature of the present invention resides in the provision of guides which extend through the movable plate, and extend through slots which are shaped to guide the plate during its up and down movement as the discs rotate.

A further feature of the invention resides in the provision of means such as a hydraulic cylinder connected to an end of the connecting means connecting the various arms so that the arms may be pivoted to extreme positions to move the movable plate from a position above the fixed shearing blade to a position adjoining the same or in side by side relation thereto, after the plate has been sheared.

A further feature of the present invention lies in the use of circular discs to pivot in the movable plate and to act as the moving means. This permits circular bearings to be used between the discs and the apertures, and permits the discs to rotate readily within the movable plate.

These and other objects and novel features of the present invention will be more clearly and fully set forth in the following specification and claims.

BRIEF DESCRIPTION OF THE DRAWINGS

In the drawings forming a part of the specification.

FIG. 2 shows in full line the movable plate in its elevated position and shows in broken lines the position of the plate in its lowered position.

FIG. 3 is a sectional view through the shear, the position of the section being indicated by the line 3—3 of FIG. 1.

FIG. 4 is a diagrammatic view of a means for actuating the hold down plate for holding the plate in position while it is being sheared.

DESCRIPTION OF THE PREFERRED EMBODIMENTS

Figure 1:
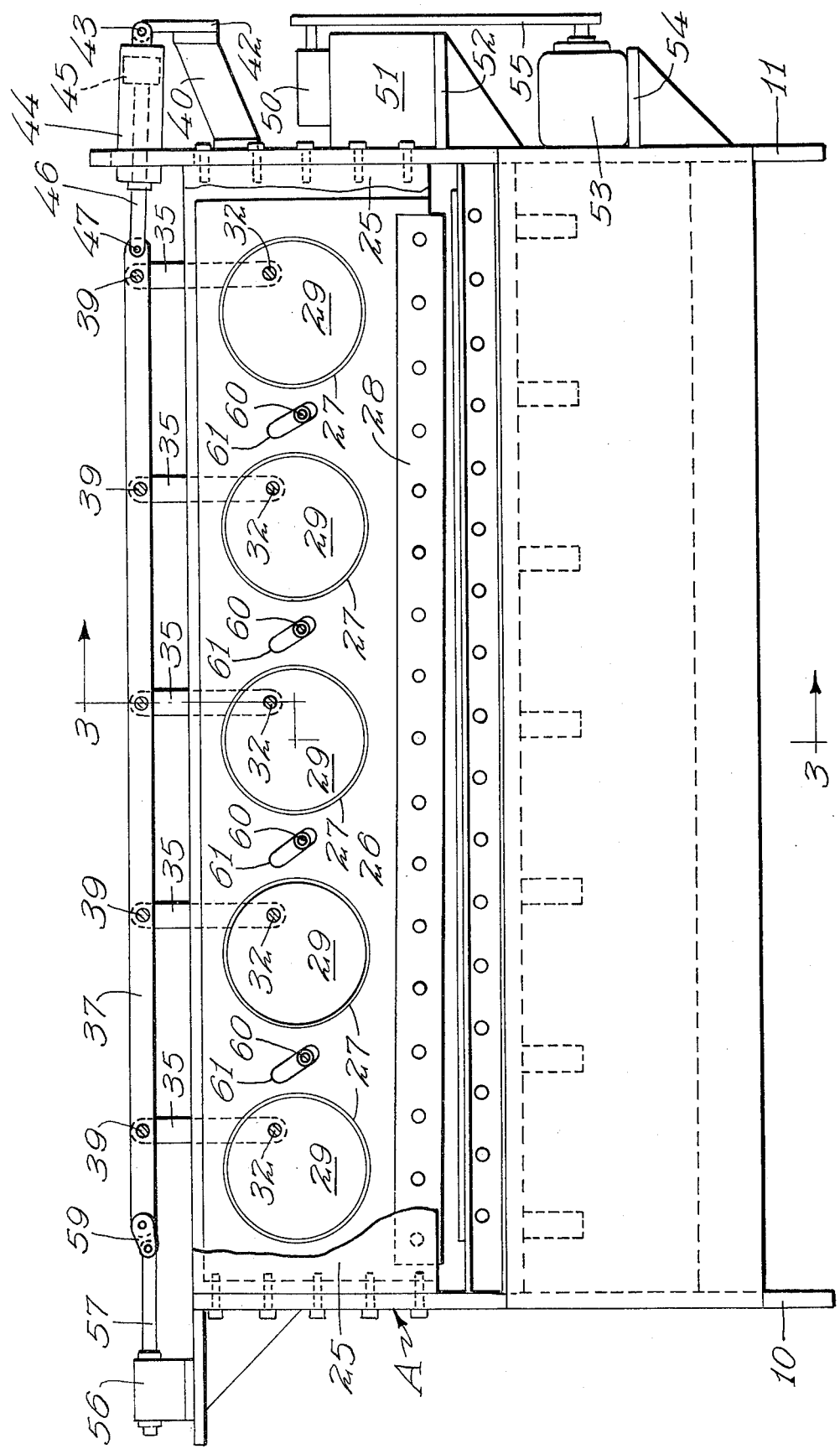
FIG. 1 is a front elevational view of the apparatus with a portion of one of the plate supports broken away to show the movable plate and the discs therein.

The bar shear is indicated in general by the letter A. As indicated in FIG. 1 of the drawings, the shear includes a pair of opposed end plates 10 and 11 between which are positioned a T-shaped frame member 12 including a vertical plate 13, and a horizontal top plate 14. Parallel side plates 15 and 16 extend from the top plate 14 to a portion of the end plates 10 and 11 as illustrated in FIG. 3 of the drawings, thus providing a sturdy top capable of sustaining the force of the shearing action. Gusset plates 18 reinforce the top plate 14 to further reinforce the base of the apparatus.

A channel 17 is provided including a top web 19, a bottom web 20, and a vertical connecting web 21. A shearing plate 22 is bolted or otherwise secured to the vertical web 21 of the channel 17 as indicated at 23.

A pair of side supports 24 and 25, which in the present form are shown as plates, extend between the end plates 10 and 11, one of these supports such as 25, being removable to provide access to the space between these plates and the movable plate. A slideable plate 26 or movable plate, as it has been sometimes described is movable between the supports 24 and 25.

With reference to FIGS. 1 and 2 of the drawings, the movable plate 26 is provided with a series of circular apertures 27 extending therethrough. The lower edge of the movable plate 26 is provided with a shearing blade 28 which is designed to cooperate with the shearing blade 22 to cut a plate of metal inserted therebetween.

Discs such as 29 are supported by bearings 30 in the circular apertures 27. The discs 29 are provided with opposed pivots 31 and 32 which are integral with, or keyed to, the discs 29. The pivots 31 and 32 extend through aligned bearings 33 and 34 in the supporting members 24 and 25 respectively and project beyond these supporting members. Arms 35 and 36 are keyed or otherwise secured to the pivots 31 and 32 and are connected thereto through a connecting member 37, and are pivotally connected thereto by pivots 39. The connecting member 37 connects the ends of the arms 36 which are entirely parallel at all times. It should be mentioned that the pivots 34 and 35 are eccentric with respect to the centers of the discs 29, and equal distance from the centers, the axes of the pivots 34 and 35 being at the same angular relation from the centers of the discs 29 at all times.

A V-shaped mounting bracket 40 extends outwardly from the frame end 11. A pivot plate 42 extends upwardly from the bracket 40 and is pivotally connected at 43 to a cylinder 44. The cylinder 44 contains a piston 45, the piston rod 46 of which is pivotally connected to the connecting member 37 at 47. The cylinder 44 is preferably double acting so as to operate the connecting member 37 in either direction.

A cylinder 44 is diagrammatically indicated as being actuated by a pump 50 mounted upon a reservoir 51 on a shelf 52 on the end member 11. A motor 53 also resting upon a shelf 54 on the end member 11 is connected by a belt 55 to the pump 50 to actuate the same. Control means are provided, not illustrated, which control the pump and the cylinder 44 which actuates the connecting member 37. A stabilizing bearing 56 slidably supports a shaft 57 pivotally connected by a link 59 to the end of the connecting member 37. The side plates 24 and 25 are connected by bolts or other fastening means 60 which extend through slots 61 in the movable plate 26. These fastening means quide the movable plate in a diagonal shearing movement.

When the connecting member 37 is urged to the left as indicated in the drawings, the arms 36 are swung into the position indicated by the broken lines 62 which indicate the axes of these arms. This rotates the discs 29 which move from the position shown at full lines in FIG. 2 to the position shown in dotted outline therein. Thus the pivoting of the pivots 31 and 32 act to lower the movable plates 26, acting to shear off a plate inserted between the cutting blades 22 and 27.

FIGS. 3 and 4 of the drawings disclose a hold down bar 63 designed to clamp the plate against the upper flange 19 of the channel 17 during the shearing operation. The bar 63 is provided at its ends with transverse slots 64 designed to accommodate bolts 65 extending through the ends of bell crank levers 66 pivotally supported to the frame as indicated at 67. Hydraulic cylinders such as 69 (see FIG. 3) pivots the levers 66 in a manner to clamp the plate to be sheared in proper position before the shearing action has started.

The operation of the apparatus is believed obvious from the foregoing description. A plate of metal or other suitable material is inserted between the cutting blades 22 and 28, and the plate is positioned so that the line to be sheared is in line with the blades. Fluid is applied to the cylinders 69 to clamp the plate. Fluid is also applied to the cylinder 44 in a direction to rotate the various discs 29 in a counter clockwise direction as viewed in the figures. This action causes the disc 29 to rotate about the axes of the pivots 31 and 32 and to lower the movable plate 26, this moves the cutting jaws 22 and 27 into overlapping relation, shearing off the plate.

The use of the relatively large diameter circular discs has several advantages. In the first place, the discs rotate freely in the needle bearings or the like providing a minimum of friction between these parts. Secondly, the leverage provided by the parallel arms 36 on the discs 29 causes a pressure sufficient to shear a relatively thick metal plate. The structure while in itself is extremely sturdy, is inexpensive to produce, and the entire device may be produced at a cost which is considerably less than the plate shears which are at present on the market. Any difficulty which is experienced with the apparatus can be readily repaired by removing the removable side of the support which provides access to the entire interior of the device.

In accordance with the Patent Statutes, I have described the principles of construction and operation of my Sheet Shear and while I have endeavored to set forth the best embodiments, I desire to have it understood that obvious changes may be made within the scope of the following claims without departing from the spirit of my invention.

I claim:

1. A metal plate shears comprising in combination:
   a frame including a pair of parallel end plates and a transverse frame member connecting said frame members,
   a fixed connecting web supported by said transverse frame member,
   a fixed blade supported by said connecting web,
   a pair of spaced plates forming support means connecting said end plates above the level of said fixed blade,
   a movable plate between said spaced plates and supported for slideable movement therebetween and having a cutting edge on its lower edge cooperable with said fixed blade to shear a plate therebetween,
   said movable plate having a plurality of circular apertures therethrough,
   disc means rotatably supported in said circular apertures,
   means pivotally supporting said discs to said fixed support means for movement about axes which are eccentric relative to the centers of said discs, said pivotal supporting means being equidistant from the centers of the discs and at the same angular relation thereto,
   means connected to said discs and extending through at least one of said spaced plates for rotating said discs about said eccentric axes, and
   means connecting said connecting means for pivoting said discs in unison.

2. The structure of claim 1 and in which said means pivotally supporting said discs is supported by both of said support means.

3. A metal plate shears comprising in combination:

a frame including a base, end members extending upwardly from said base, a pair of fixed supporting means extending between said end members in spaced parallel relation in spaced relation to said base, a movable plate slidably supported between said spaced supporting means and engaged thereby for guidance in movement, a movable shearing blade supported by said movable plate along the lower edge thereof, a fixed shearing blade supported by said base cooperable with said movable shearing blade, said movable plate having a series of circular apertures of equal diameter therethrough, discs in each of said apertures and rotatable therein, pivot means eccentric with respect to the centers of said discs, the pivot means being fixed relative to said discs and spaced from the centers of said discs on equal distance and in the same angular relation with respect thereto, said pivot means being supported by said supporting means and extending through both of them, means connected to said pivot means to rotate said discs in unison, and means connecting said connecting means for rotating said discs in unison about said eccentric pivot means to move said movable plate from position in spaced relation to said fixed shearing blade to a position adjacent to said fixed shearing blade to shear a plate inserted between said blades.

4. The structure of claim 3 and in which said means connected to said pivot means includes arms secured to said pivot means in parallel relation, and means pivotally connecting said arms for movement in unison.

5. The structure of claim 4 and including a hydraulic cylinder connected to said means pivotally connecting said arms for actuating the same.

6. The structure of claim 4 and in which said arms extend generally vertically, and said means pivotally connecting said arms extends generally horizontally.

7. The structure of claim 3 and including bearings between said discs and said circular apertures.

8. The structure of claim 3 and including bearing means between said discs and said supporting means.

9. The structure of claim 3 and including guide means extending between said supporting means and extending through slots in said movable plate.

* * * * *